United States Patent
Ichinose et al.

(10) Patent No.: US 6,938,875 B2
(45) Date of Patent: Sep. 6, 2005

(54) PROPORTIONAL SOLENOID VALVE

(75) Inventors: Yuta Ichinose, Tokyo (JP); Yoshihiko Onishi, Tokyo (JP); Kenji Nakao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/682,938

(22) Filed: Oct. 14, 2003

(65) Prior Publication Data

US 2004/0211930 A1 Oct. 28, 2004

(30) Foreign Application Priority Data

Apr. 25, 2003 (JP) ......................... 2003-121563

(51) Int. Cl.⁷ .............................................. F16K 31/02
(52) U.S. Cl. ........................... 251/129.08; 251/129.18; 251/285
(58) Field of Search ..................... 251/129.18, 129.08, 251/129.15, 284, 285, 363

(56) References Cited

U.S. PATENT DOCUMENTS

| | | | | | |
|---|---|---|---|---|---|
| 3,469,590 | A | * | 9/1969 | Barker | 251/129.08 |
| 4,346,847 | A | * | 8/1982 | Rissi | 251/129.15 |
| 5,011,043 | A | * | 4/1991 | Whigham et al. | 251/129.18 |
| 5,246,199 | A | * | 9/1993 | Numoto et al. | 251/129.15 |
| 5,467,961 | A | * | 11/1995 | Sausner et al. | 251/129.15 |
| 5,503,366 | A | * | 4/1996 | Zabeck et al. | 251/129.18 |
| 5,513,673 | A | * | 5/1996 | Slavin et al. | 251/129.08 |
| 5,984,263 | A | * | 11/1999 | Hosoya | 251/129.15 |
| 6,050,542 | A | * | 4/2000 | Johnson et al. | 251/129.08 |
| 6,336,621 | B1 | * | 1/2002 | Ii et al. | 251/129.15 |
| 6,422,259 | B1 | * | 7/2002 | Moreno | 251/129.18 |
| 6,530,528 | B2 | * | 3/2003 | Breyer et al. | 251/129.15 |

FOREIGN PATENT DOCUMENTS

| | | |
|---|---|---|
| DE | 44 23 103 C2 | 1/1996 |
| DE | 196 50 445 C1 | 6/1998 |
| DE | 198 47 304 C2 | 5/2000 |
| DE | 101 01 247 A1 | 7/2001 |
| EP | 1134470 A2 * | 9/2001 |
| JP | 61-63088 | 4/1986 |
| JP | 11-287349 | 10/1999 |
| JP | 2002-188744 | 7/2002 |
| JP | 2002-317726 | 10/2002 |

* cited by examiner

*Primary Examiner*—John Bastianelli
(74) *Attorney, Agent, or Firm*—Sughrue Mion, PLLC

(57) ABSTRACT

In a proportional solenoid valve, a valve drive portion that includes a coil, a core that is excited by application of a current to the coil, a plunger that is displaced by a magnetic attraction force generated by the excited core, and a spring that biases the plunger in a direction in which a distance to the core is increased. The spring is set so that a space is maintained between the plunger and an attraction surface of the core when the spring is fully compressed.

2 Claims, 3 Drawing Sheets

PROPORTIONAL SOLENOID VALVE

BACKGROUND OF THE INVENTION

1. Field of the Invention

The present invention relates to a proportional solenoid valve that displaces a valve element by applying a current to a solenoid coil and obtains an output pressure proportional to the value of the applied current, and a control method for the proportional solenoid valve.

2. Description of the Related Art

In a conventional proportional solenoid valve, when a high current exceeding an ordinary working current range is applied to a solenoid coil or when a high pressure is temporarily exerted on a valve element due to pulsation of an input pressure, for instance, a plunger is displaced to exceed an ordinary operating range. In this case, if an end surface of the plunger is attracted so as to directly contact an end surface of a core, there occurs a malfunction of the plunger and output pressure becomes unstable. In view of this problem, a stopper made of a non-magnetic material is arranged between the end surface of the plunger and the end surface of the core (see Japanese Utility Model Application Laid-Open No. 61-63088, for instance).

In the conventional proportional solenoid valve described above, however, the stopper is arranged between the plunger and the core, so that the number of components and the number of assembly steps are increased, which leads to an increase in cost. In addition, there is a problem that variations occur in magnetic attraction force characteristics.

SUMMARY OF THE INVENTION

The present invention has been made in order to solve the problems described above, and provides a proportional solenoid valve with which it is possible to reduce the number of components and to stabilize magnetic attraction force characteristics.

In a proportional solenoid valve according to the present invention, a spring is set so that a space is maintained between the plunger and an attraction surface of a core when the spring is fully compressed. With this construction, the spring is fully compressed before the plunger is abutted against the attraction surface. The plunger does not directly contact an attraction surface.

Further, in a proportional solenoid valve according to the present invention: a bearing is provided with an extension portion that extends along an axial direction of the rod and regulates the displacement of a plunger toward a core side, and when the plunger is abutted against an end surface of the extension portion, a space is maintained between the plunger and an attraction surface of the core. With this construction, even when the plunger is displaced to exceed an ordinary operating range. The plunger does not directly contact an attraction surface.

Furthermore, in a proportional solenoid valve according to the present invention, a load adjust member is provided with an abutment portion which an end surface of the rod is abutted against and regulates the displacement of the plunger toward a core side, and when the end surface of the rod is abutted against the abutment portion, a space is maintained between the plunger and an attraction surface of the core. With this construction, even when the plunger is displaced to exceed an ordinary operating range. The plunger does not directly contact an attraction surface.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will now be described based on the accompanying drawings.

First Embodiment

A proportional solenoid valve according to a first embodiment of the present invention is a hydraulic circuit for an electronically controlled automatic transmission for an automobile (hereinafter simply referred to as an "automatic transmission"), and is used to change the operating oil pressure in an operating portion of the automatic transmission.

Figure 1:
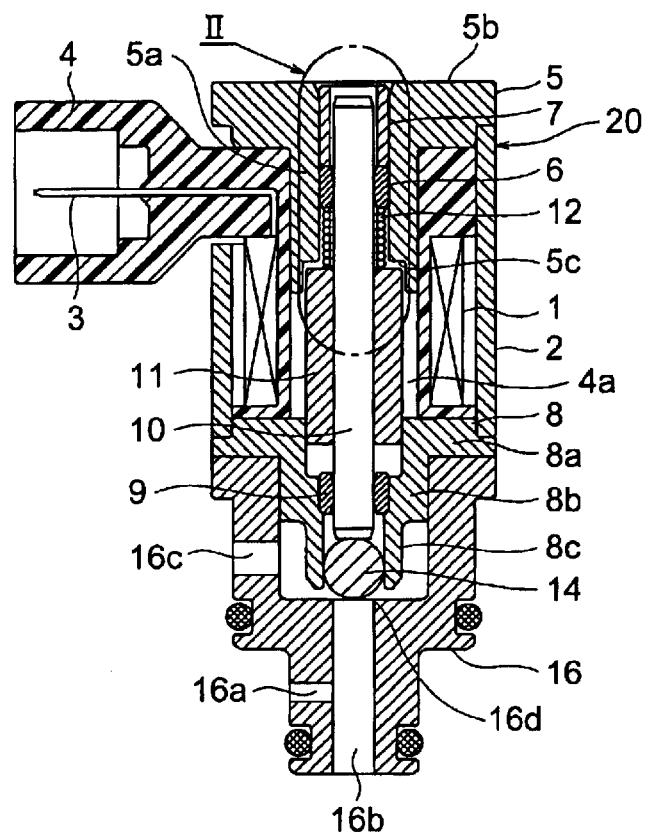
FIG. 1 is a cross-sectional view of a proportional solenoid valve according to a first embodiment of the present invention.

FIG. 1 is a cross-sectional view of the proportional solenoid valve according to the first embodiment of the present invention. Note that in this drawing, there is illustrated a proportional solenoid valve of a normally high type. Also, a coil 1 is accommodated in a cylindrical case 2 made of metal and a terminal 3 for connecting the coil 1 to a power supply is arranged outside of the case 2. Further, the coil 1 and the terminal 3 are molded by a resin portion 4 and a plunger accommodating hole 4a that passes through the hollow portion of the coil 1 while extending in the axial direction of the coil 1 is provided in the resin portion 4.

To one end portion of the resin portion 4, there is coupled a core 5 made of metal. This core 5 includes a cylinder portion 5a inserted into one end portion of the plunger accommodating hole 4a and a flange portion 5b that is abutted against an end surface of the resin portion 4. The flange portion 5b is welded to the case 2 at the outer periphery of its joining surface with the case 2.

Into the cylinder portion 5a, there is inserted a first plain bearing 6. Also, a cylindrical load adjustment member (spring pin) 7 is press-fitted into the cylinder portion 5a.

To the other end portion of the resin portion 4, there is coupled a guide member 8 made of metal. This guide member 8 includes an annular-shaped flange portion 8a abutted against an end surface of the resin portion 4, a cylindrical fitting portion 8b that protrudes from the flange portion 8a, and a cylindrical valve guide portion 8c that extends from one end portion of the fitting portion 8b. The flange portion 8a is welded to the case 2 at the outer periphery of its joining surface with the case 2. The diameter of the valve guide portion 8c is made smaller than the diameter of the fitting portion 8b.

In the valve guide portion 8c, there is fixed a second plain bearing 9. Into the first plain bearing 6 and the second plain bearing 9, a rod 10 is inserted so as to be slidable. This rod 10 is arranged inside of the core 5, the plunger accommodating hole 4a, and the guide member 8 so as to be capable of reciprocating in the axial direction of the coil 1.

To the middle portion of the rod 10, there is fixed a cylindrical plunger 11. That is, the rod 10 is press-fitted into the plunger 11. A spring 12 is arranged between the plunger 11 and the first plain bearing 6. The plunger 11 is made capable of reciprocating integrally with the rod 10 inside of the plunger accommodating hole 4a. In the cylinder portion 5a of the core 5, an attraction surface 5c is provided opposite to the end surface of the plunger 11.

In the valve guide portion 8c, there is inserted a ball-shaped (spherical) valve element 14 against which a tip portion of the rod 10 is abutted. The load of the spring 12 that biases the plunger 11 toward the valve element 14 is adjusted by changing the position of the load adjustment member 7. To the fitting portion 8b, there is fitted a housing 16 defining a flow path for oil. The housing 16 is welded to the flange portion 8a at the outer periphery of its joining surface with the flange portion 8a.

Also, the housing 16 includes an input port 16a through which the oil is supplied, an output port 16b that communicates with the input port 16a, and a drain port 16c from which a portion of the oil supplied through the input port 16a is discharged. Further, between the input port 16a and the drain port 16c and between the output port 16b and the drain port 16c, there is provided a seat portion 16d which the valve element 14 is brought into and out of contact with.

Also, the case 2, the core 5, the guide member 8, and the plunger 11 collectively constitute a magnetic circuit. The core 5 functions as a magnetic attraction portion for the plunger 11. A valve drive portion 20 in this first embodiment includes the coil 1, the case 2, the terminal 3, the resin portion 4, the core 5, the first plain bearing 6, the load adjustment member 7, the guide member 8, the second plain bearing 9, the rod 10, the plunger 11, and the spring 12.

Figure 2:
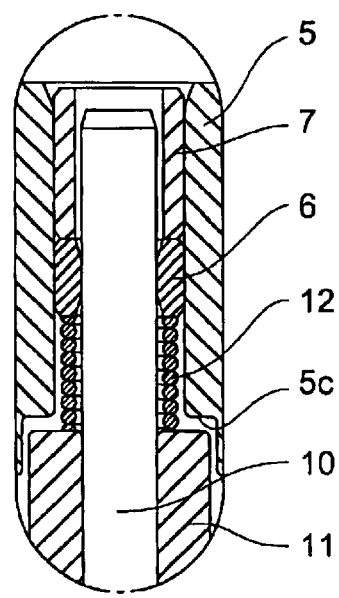
FIG. 2 is a magnified cross-sectional view of portion 11 shown in FIG. 1.

FIG. 2 is a magnified cross-sectional view of portion II shown in FIG. 1. The spring 12 is set so that a space is maintained between the plunger 11 and the attraction surface 5c of the core 5 when the spring 12 is fully compressed. Note that FIGS. 1 and 2 each show a state where the spring 12 is fully compressed, and an opening degree of the valve element 14 is changed within a range smaller than that shown in the drawings during an ordinary operation.

Next, there will be described an operation in this embodiment. Under a state where the coil 1 is not excited, the plunger 11 is pressed to the valve element 14 side by the spring force of the spring 12. Consequently, the valve element 14 is pressed against the seat portion 16d by the rod 10, and the oil flow path to the drain port 16c is closed. As a result, a high-pressure output is obtained from the output port 16b.

When the coil 1 is excited and an electromagnetic force attracting the plunger 11 exceeds a predetermined degree, the plunger 11 and the rod 10 are displaced in opposition to the spring force of the spring 12 in a direction in which their distances to the seat portion 16d are increased. When doing so, a pressing force exerted through the rod 10 (force obtained by subtracting the electromagnetic force generated in proportion to the value of a current applied to the coil 1 from the compressive load of the spring 12) and a fluid force resulting from a pressure output from the output port 16b are exerted on the valve element 14, so that the valve element 14 is displaced to a position at which there is struck a balance between the pressing force and the fluid force. As a result, an output pressure proportional to the current value is obtained from the output port 16b. Note that in an ordinary working range, the plunger 11 does not contact the attraction surface 5c of the core 5.

In the hydraulic circuit for an automatic transmission in which this proportional solenoid valve is arranged, the oil accumulated in an oil pan, that is, an automatic transmission fluid is pumped by an oil pump. The oil pump is driven in synchronization with an engine. The automatic transmission fluid pumped by the oil pump is adjusted to a predetermined pressure by a regulator or the like and then is sent to the input port 16a under pressure.

Then, by the output pressure from the output port 16b, the opening/closing of a control valve is controlled and a clutch is controlled, thereby performing a shifting operation. Also, the automatic transmission fluid discharged from the drain port 16c is recovered by the oil pan.

Here, when a high current exceeding an ordinary working current range is applied to the coil 1 or when a high pressure is temporarily exerted on the valve element 14 due to pulsation of an input pressure, for instance, the plunger 11 is displaced to exceed an ordinary operating range. However, the spring 12 is fully compressed before the plunger 11 is abutted against the attraction surface 5c, so that a situation where the plunger 11 is attracted so as to directly contact the attraction surface 5c is prevented. As a result, it becomes possible to obtain a stabilized output pressure. Also, it is not required to provide an additional component between the plunger 11 and the attraction surface 5c, so that it becomes possible to reduce the number of components and the number of assembly steps, contributing to cost reduction. Further, it becomes possible to stabilize magnetic attraction force characteristics.

Second Embodiment

Figure 3:
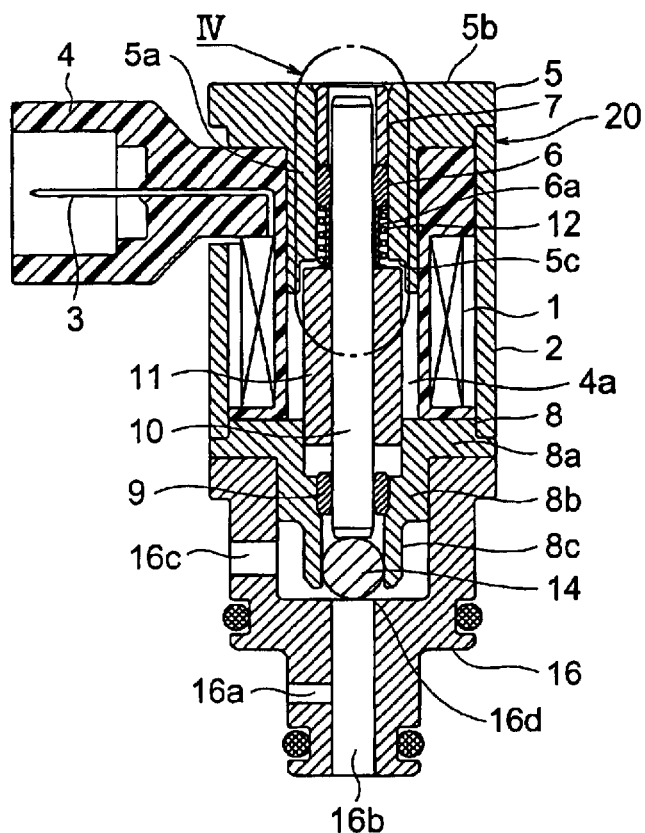
FIG. 3 is a cross-sectional view of a proportional solenoid valve according to a second embodiment of the present invention.
Figure 4:
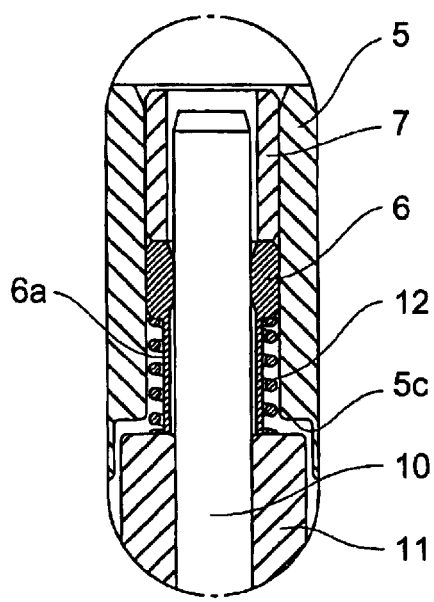
FIG. 4 is a magnified cross-sectional view of portion IV shown in FIG. 3.

Next, there will be described a second embodiment of the present invention. FIG. 3 is a cross-sectional view of a proportional solenoid valve according to the second embodiment, while FIG. 4 is a magnified cross-sectional view of portion IV shown in FIG. 3. In these drawings, the first plain bearing 6 serving as a bearing is provided with a cylindrical extension portion 6a that extends along the axial direction of the rod 10 and regulates the displacement of the plunger 11 toward the core 5 side. With this extension portion 6a, when the plunger 11 is abutted against an end surface of the extension portion 6a, a space is maintained between the plunger 11 and the attraction surface 5c of the core 5. Here, the first plain bearing 6 is made of a non-magnetic material. Also, the inside diameter of the extension portion 6a is made larger than the inside diameter of the main body portion of the first plain bearing 6. Further, even when the plunger 11 is abutted against the end surface of the extension portion 6a, the spring 12 is not fully compressed. Other constructions are the same as those in the first embodiment.

As described above, the first plain bearing 6 is provided with the extension portion 6a, so that even if the plunger 11 is displaced to exceed the ordinary operating range, a situation where the plunger 11 is attracted so as to directly contact the attraction surface 5c is prevented. As a result, it becomes possible to obtain a stabilized output pressure. Also, it is not required to provide an additional component between the plunger 11 and the attraction surface 5c, so that it becomes possible to reduce the number of components and the number of assembly steps, contributing to cost reduction. Further, it becomes possible to stabilize magnetic attraction force characteristics.

It should be noted here that in the second embodiment, there has been described a case where one cylindrical extension portion 6a is provided, although multiple rod-shaped extension portions may be provided at regular intervals in the circumferential direction of the first plain bearing 6.

Also, in FIG. 4, the extension portion 6a is arranged inside of the spring 12, although this portion 6a may also be arranged outside of the spring 12.

Third Embodiment

Figure 5:
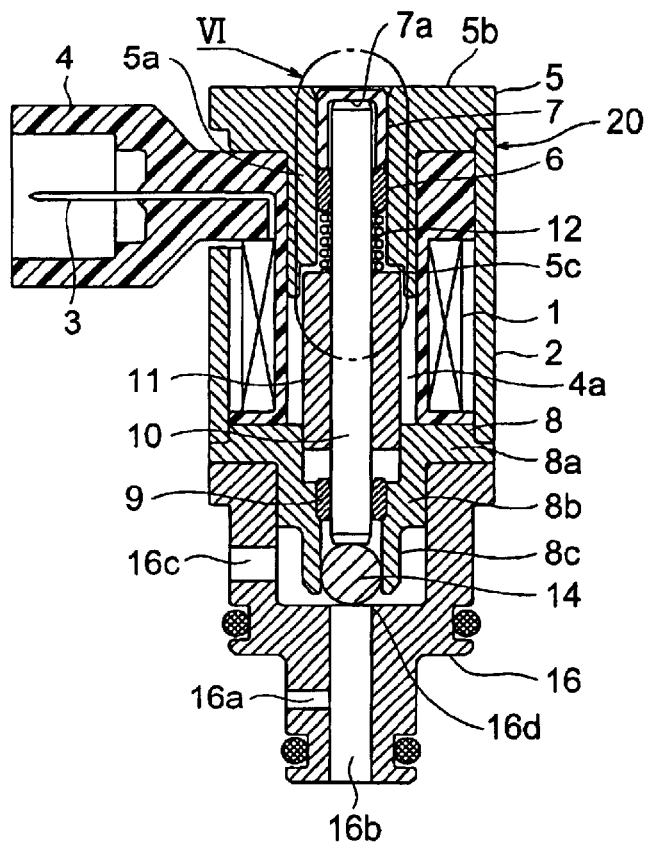
FIG. 5 is a cross-sectional view of a proportional solenoid valve according to a third embodiment of the present invention.
Figure 6:
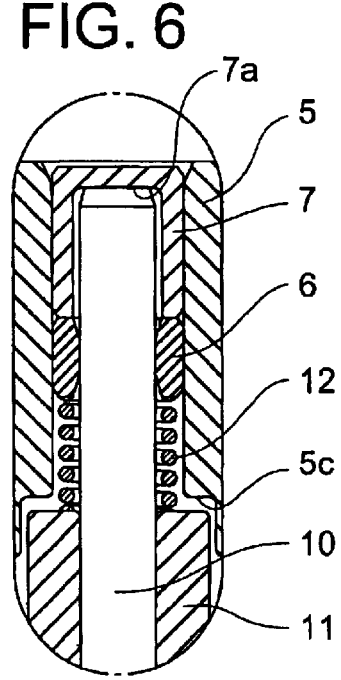
FIG. 6 is a magnified cross-sectional view of portion VI shown in FIG. 5.

Next, there will be described a third embodiment of the present invention. FIG. 5 is a cross-sectional view of a proportional solenoid valve according to the third embodiment of the present invention. FIG. 6 is a magnified cross-sectional view showing a portion VI of FIG. 5. In these drawings, the load adjustment member 7 is provided with the abutment portion 7a that regulates the displacement of the plunger 11 toward the core 5 side by the abutment with the end surface of the rod 10. When the abutment portion 7a abuts the end surface of the rod 10, a space is maintained between the plunger 11 and an attraction surface of the core 05. Also when the abutment portion 7a abuts the rod 10, the spring 12 is not completely compressed. Other constructions are the same as those in the first embodiment.

As described above, the load adjustment member 7 is provided with the abutment portion 7a, so that even if the plunger 11 is displaced to exceed an ordinary operating range, a situation is prevented where the plunger 11 is attracted so as to directly contact the attraction surface 5c. As a result, it becomes possible to obtain a stabilized output pressure. Also, it is not required to provide an additional component between the plunger 11 and the attraction surface 5c, so that it becomes possible to reduce the number of components and the number of assembly steps, contributing to cost reduction. Further, it becomes possible to stabilize magnetic attraction force characteristics.

It should be noted here that in the third embodiment, although the abutment portion 7a is provided so that one end portion of the cylindrical load adjustment member 7 is completely closed, as long as displacement of the rod 10 can be regulated it only a step portion need be provided on the inner surface of the load adjustment member 7.

Also, in the first to third embodiments, there has been described a proportional solenoid valve of a normally high type whose output pressure is high at the time of non-energization and is decreased in accordance with an increase in applied current. However, the present invention is also applicable to a proportional solenoid valve of a normally low type whose output pressure is low at the time of non-energization and is increased in accordance with an increase in applied current.

Further, although in the first to third embodiments a proportional solenoid valve arranged in the hydraulic circuit for an automatic transmission has been described, the present invention can be applied to a proportional solenoid valve for any intended use.

What is claimed is:

1. A proportional solenoid valve comprising:

a seat portion;

a valve element that is brought into and out of contact with the seat portion; and a valve drive portion that (i) includes a coil, a core that is excited by application of a current to the coil, a plunger that is displaced by a magnetic attraction force generated by the excited core, a rod that is abutted against the valve element and is displaced integrally with the plunger, a bearing that holds the rod in a slidable manner, and a spring that is provided between the bearing and the plunger and biases the plunger in a direction in which a distance to the core is increased, and (ii) displaces the valve element in accordance with the current applied to the coil, wherein the bearing is provided with an extension portion that extends along an axial direction of the rod and regulates the displacement of the plunger toward a core side, so that when the plunger is abutted against an end surface of the extension portion, a space is maintained between the plunger and an attraction surface of the core.

2. A proportional solenoid valve comprising:

a seat portion;

a valve element that is brought into and out of contact with the seat portion; and a valve drive portion that (i) includes a coil, a core that is excited by application of a current to the coil, a plunger that is displaced by a magnetic attraction force generated by the excited core, a rod that is abutted against the valve element and is displaced integrally with the plunger, a spring that biases the plunger in a direction in which a distance to the core is increased, and a load adjustment member that is displaced with reference to the core in an axial direction of the rod to thereby adjust a compressive load of the spring, and (ii) displaces the valve element in accordance with the current applied to the coil, wherein the load adjustment member is provided with an abutment portion which an end surface of the rod is abutted against and regulates the displacement of the plunger toward a core side, so that when the end surface of the rod is abutted against the abutment portion, a space is maintained between the plunger and an attraction surface of the core.

* * * * *